(12) United States Patent
Fukushima et al.

(10) Patent No.: US 7,289,721 B1
(45) Date of Patent: Oct. 30, 2007

(54) METHOD AND APPARATUS FOR DATA REPRODUCTION

(75) Inventors: Akio Fukushima, Yokohama (JP); Hiroyuki Kimura, Hiratsuka (JP); Hiroo Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 677 days.

(21) Appl. No.: 09/653,681

(22) Filed: Sep. 1, 2000

(30) Foreign Application Priority Data

Nov. 15, 1999 (JP) ............................... 11-323652
Mar. 16, 2000 (JP) ............................... 12-073777

(51) Int. Cl.
H04N 5/91 (2006.01)
H04N 7/00 (2006.01)
H04N 9/80 (2006.01)

(52) U.S. Cl. .......................... 386/96; 386/29; 386/39; 386/125; 386/126; 348/462

(58) Field of Classification Search .................. 386/96, 386/95, 103, 104, 105, 106, 46, 54, 92, 29–39, 386/125–126, 83; 360/60, 49, 58; 382/100, 382/232–233; 380/217, 210; 216/217
See application file for complete search history.

(56) References Cited

U.S. PATENT DOCUMENTS

| | | | | |
|---|---|---|---|---|
| 5,513,260 A | * | 4/1996 | Ryan ........................... | 380/200 |
| 5,659,613 A | * | 8/1997 | Copeland et al. ........... | 380/202 |
| 5,680,500 A | * | 10/1997 | Takahashi et al. ........... | 386/95 |
| 5,739,865 A | * | 4/1998 | Takahashi ............... | 375/240.03 |
| 5,881,204 A | * | 3/1999 | Nishiumi et al. ............. | 386/96 |
| 5,956,460 A | * | 9/1999 | Yamagata et al. ............ | 386/96 |
| 6,038,370 A | * | 3/2000 | Ogikubo ....................... | 386/96 |
| 6,192,189 B1 | * | 2/2001 | Fujinami et al. .............. | 386/96 |
| 6,671,376 B1 | * | 12/2003 | Koto et al. ................... | 380/210 |
| 6,707,465 B2 | * | 3/2004 | Yamazaki et al. .......... | 345/629 |
| 6,826,289 B1 | * | 11/2004 | Hashimoto ................... | 382/100 |

FOREIGN PATENT DOCUMENTS

| | | |
|---|---|---|
| JP | 09-231730 A | 9/1997 |
| JP | 10-188471 A | 7/1998 |
| JP | 11-144381 A | 5/1999 |
| JP | 11-176089 A | 7/1999 |
| JP | 11-296976 A | 10/1999 |
| WO | WO98/33325 A2 | 7/1998 |
| WO | WO99/11064 A2 | 3/1999 |
| WO | WO99/45704 A2 | 9/1999 |

OTHER PUBLICATIONS

European Patent Office (EPO) examination dated Apr. 4, 2007 for EPO patent application EP00309689.

* cited by examiner

*Primary Examiner*—John Miller
*Assistant Examiner*—Jamie Jo Vent
(74) *Attorney, Agent, or Firm*—Townsend and Townsend and Crew LLP

(57) ABSTRACT

A data reproduction method and apparatus includes first circuitry to produce an information signal from a storage medium. The information signal includes copy control information. Detection circuitry is provided to detect the copy control information. Control circuitry is provided to operate the first circuitry to selectively output the information signal based on the detection result of the detection circuitry.

24 Claims, 6 Drawing Sheets

US 7,289,721 B1

METHOD AND APPARATUS FOR DATA REPRODUCTION

CROSS-REFERENCES TO RELATED APPLICATIONS

The present application is related to and claims priority from Japanese Patent Application No. 11-323652, filed on Nov. 15, 1999 and Japanese Patent Application No. 00-073777, filed on Mar. 16, 2000.

BACKGROUND OF THE INVENTION

The present invention relates to a method of transmitting another data by embedding it in image and/or voice data and to an apparatus for reproducing the transmitted data. Specifically, it relates to a data reproduction apparatus comprising LSI circuitry having the function of detecting embedded data.

Technologies for embedding another data in image, voice and text data are also called "data hiding", "watermark", and "electronic watermark" and have been investigated as a technology for embedding identification information or notes connected with these image, voice and text data.

These technologies have been recently been applied as a technology for embedding data for the protection of the copyright of these information to prevent illegal operation such as illegal reproduction. The technologies are described in "Nikkei Electronics" published by Nikkei BP Co. (pp. 149 to 162, Feb. 24, 1997).

If data to be embedded are deteriorated by processing operation such as the filtering and/or compression of original data, it loses the function of preventing illegal operation. Therefore, the method of embedding data is changed or data is embedded repeatedly so that the data still remain effective after these processes are carried out.

Various permissions concerning the limitation of reproduction are conceivable for original data. For example, original data can be reproduced, cannot be reproduced or can be reproduced only once in connection with copyright. It is now being considered that such control of reproduction is to be carried out by embedding data corresponding to these permissions and detecting it.

Heretofore, in the research and development of the function of detecting embedded data (to be referred to as "watermark detection function" hereinafter), special hardware and digital signal processors (DSP) have been used as watermark detection devices. The reason for this is that the data processing required for the implementation of a watermark detection device is complicated and high operation speed is required. As a result, the cost of a watermark detection device is significantly large compared with the cost of a system incorporating this device.

Owing to recent progress made in semiconductor technology, the performance-cost ratio of a high-speed arithmetic unit greatly improves. Considering that devices which carry out reproduction control are image/voice reproduction devices for domestic use such as DVD video players and that they are relatively inexpensive, there still remains such a problem that costs required for the addition of a watermark detection function cannot be negligible.

To solve the above problem, a watermark detection circuit must be made inexpensive by reducing its scale. Generally speaking, to cut the cost of a digital arithmetic unit while maintaining its certain functions, the following methods are effective:

(1) a portion where parallel processing is carried out is changed to perform a single processing in order to carry out serial processing, and (2) arithmetic processing blocks such as a memory, adder and multiplier are made general-purpose blocks to be shared in each stage of arithmetic processing.

The downside of the above method is that the time required for processing is prolonged though they are effective in cost reduction.

The problem that the processing time required for watermark detection is prolonged will be described hereinafter, taking the case where DVD video reproduction which will be controlled shortly is carried out by a DVD player and a DVD-ROM drive.

Since DVD video data recorded on a DVD disk are MPEG2 formatted, the decoding of MPEG2 formatted data must be carried out to correctly reproduce original information. MPEG2 specifies the lowest data reproduction rate required for image and voice data at the time of decoding. When the transfer rate of data input into an MPEG2 decoder is lower than this rate, image and voice data cannot be reproduced correctly. Therefore, the MPEG2 data transfer rate has a lower limit.

Meanwhile, the data transfer rate which enables watermark detection is limited for the above reason. Therefore, the data transfer rate which enables watermark detection cannot be lower than the lower limit of the above MPEG2 data transfer rate.

In the DVD-ROM drive, how fast data can be transferred compared with the ordinary data transfer rate as an additional value of a product is considered to be the most important point. When the ordinary transfer rate specified by the standards is 1, DVD-ROM drives which can transfer data at a maximum data transfer rate 6 to 10 times higher than the ordinary transfer rate are already available on the market. The reduction of the data transfer rates of these products for watermark detection is not allowed from the viewpoint of product value.

Therefore, watermark detection from the output data of a DVD-ROM drive having a high data transfer rate involves more difficulties than in a DVD player in terms of data transfer rate which enables watermark detection.

As described above, to introduce reproduction control means making use of watermarks, such problems as costs required for the addition of a watermark detection function and processing speed which enables watermark detection must be solved at the same time. This is a big theme to be targeted.

SUMMARY OF THE INVENTION

The present invention relates to a method and apparatus for playback of first data contained, for example on a storage medium, where the first data is some combination of audio and video information and includes second data. According to the invention, the first data is produced by a first circuit. At least some of the first data is delivered to a data store, including the second data. The data contained in the data store is processed, and a detection result is produced based at least on the second data. The first circuit is controlled by a second circuit to selectively output the first data based on the detection result.

In an embodiment of the invention, a detection circuit separate from the first circuit is provided to produce the detection result. In variations of the embodiment, the detection circuitry can provide verification functions such as repeated detection of multiple occurrences of the second data before asserting a detection signal. The detection circuitry can interact with the second circuitry to verify the integrity of the circuitry and thus prevent unauthorized tampering with the circuitry. The detection circuitry can used encryption techniques to thwart attempts to alter the signal.

The invention provides the advantage wherein the first data can be processed by the first circuit at a high data transfer rate. Thus, for example, in an MPEG-2 application, the data rate can be sufficiently high to provide faithful reproduction of the signal. At the same time, the detection circuit can provide the watermark detection function without restricting the conversion speed of the first circuit.

BRIEF DESCRIPTION OF THE DRAWINGS

The teachings of the present invention can be readily understood by considering the following detailed description in conjunction with the accompanying drawings.

DESCRIPTION OF THE EMBODIMENTS

An optical disk reproduction system will be described as an example. It should be understood that the present invention is not limited to the optical disk reproduction system but can be applied to general data recording and reproduction apparatuses including an optical disk recording and reproduction apparatus and a magnetic recording and reproduction apparatus.

A case where the type of embedded data is reproduction control information for the protection of copyright is taken into consideration. As a matter of course, the embedded information is not limited to reproduction control information and may be information indicative of the type of data or control information corresponding to each recording medium.

When data are to be reproduced, reproduction control for the protection of copyright may be necessary. Data may be transmitted by waves like broadcasting data and recorded on a disk or cassette as a medium. Therefore, reproduction control information is detected according to the form of data and reproduction control or recording control must be carried out accordingly.

Figure 1:
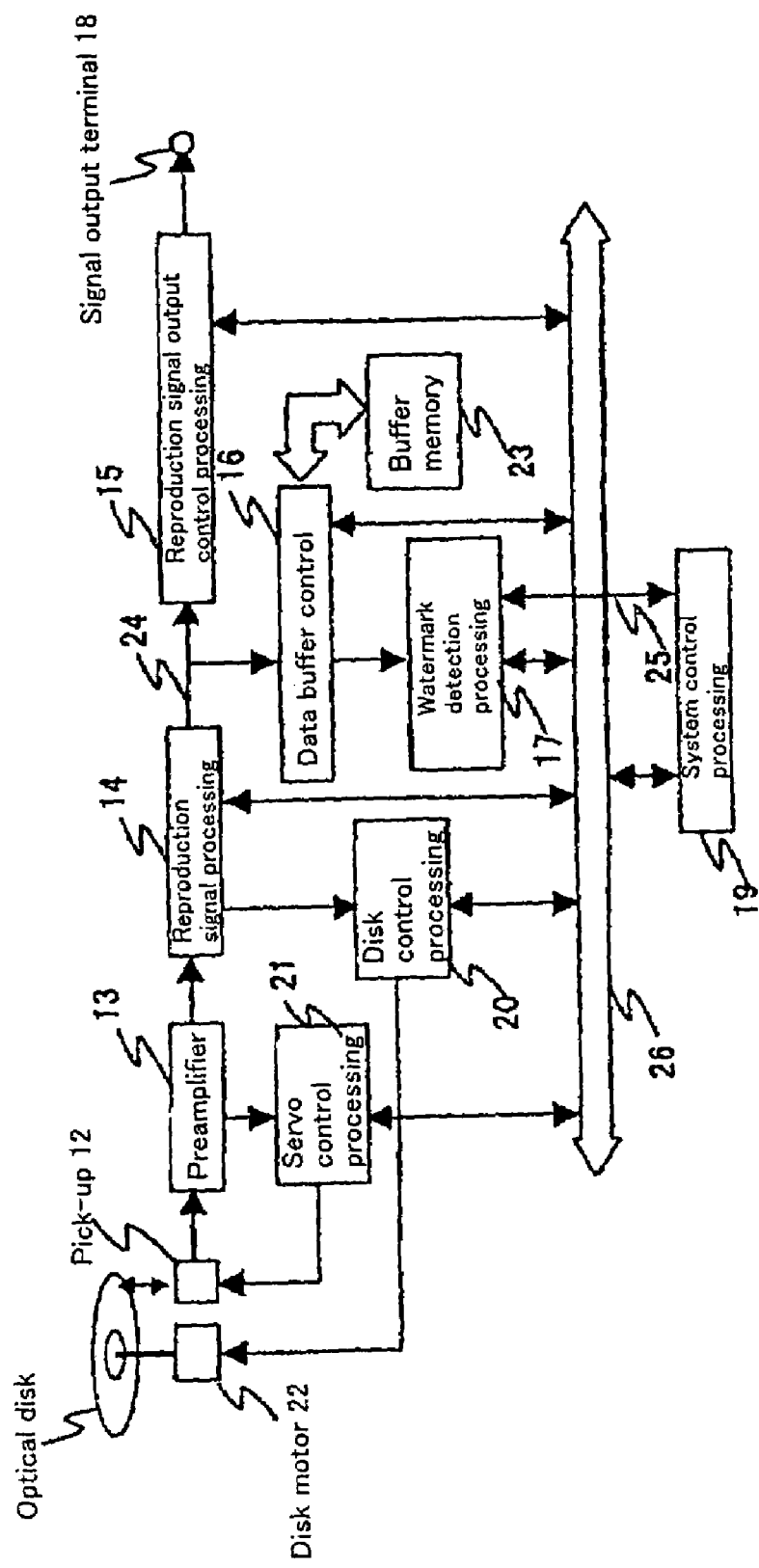
FIG. 1 is a diagram showing an example of a reproduction apparatus having a watermark detection function according to the present invention.

FIG. 1 shows an example of the constitution of a data reproduction apparatus having a watermark detection function according to the present invention.

In FIG. 1, reference numeral 11 denotes an optical disk which is a recording medium, 12 pick-up, 13 preamplifier, 14 reproduction signal processing block, 15 reproduction signal output processing block, 16 data buffer control block, 17 watermark detection processing block, 18 signal output terminal, 19 system control processing block, 20 disk control processing block, 21 servo control processing block, 22 disk motor, 23 buffer memory, 24 reproduction data, 25 exclusive data bus between the watermark detection processing block 17 and the system control processing block 19, and 26 general-purpose data bus in the optical disk reproduction system.

The reproduction signal processing block 14 serves as reproduction processing means of processing the reproduction of first data which is image and voice information and second data which is additional information to the first data embedded in the first data from an information recording medium. The watermark detection processing block 17 serves as detection means of detecting the second data embedded in the first data. The data buffer control block 16 and the system control processing block 19 serve as data selection means of selecting data required for the detection of the second data embedded in the first data from the first data. The buffer memory 23 serves as data storage means of storing first data required for the detection of the second data. The reproduction-signal output processing block 15 and the system control processing block 19 serve as reproduction control means of controlling reproduction by the reproduction processing means according to the detection result of the detection means.

A signal reproduced by the pick-up 12 from the optical disk 11 is amplified by the preamplifier 13 and input into the reproduction signal processing block 14.

The reproduction signal processing block 14 serves as reproduction processing means of processing the reproduction of first data which is image and voice information and second data which is additional data to the first data embedded in the first data from an information recording medium and carries out the processing of outputting a digital signal such as the rearrangement of data or the correction of an error according to a format based on which a reproduction signal is recorded. Since this block is not directly related to the present invention, its detailed description is omitted.

The reproduction signal output processing block 15 rearranges output data according to a predetermined interface format such as ATAPI or SCSI, controls a buffer or responds to a command. Since this block is not directly related to the present invention, its detailed description is omitted.

The data buffer control block 16 temporarily stores processed data 24 which may include watermark information in the buffer memory 23.

The watermark detection processing block 17 serves as detection means of detecting the second data embedded in the first data, reads data temporarily stored in the buffer memory 23 through the data buffer control block 16 and processes a digital signal to detect watermark information from the data. The disk control processing block 20 controls the rotation of an optical disk.

The servo control processing block 21 carries out the servo control of a pick-up actuator (included in the pick-up 12 and not shown) and a pick-up position control motor (not shown).

The system control processing block 19 controls the entire optical disk reproduction system and serves as information recording medium judging means for detecting the type of the information recording medium and reproduction control means of controlling reproduction by the reproduction processing means according to the detection result of the detection means, and controls the operation of the apparatus while communicating information required for control with the processing blocks. The type of the information recording medium is judged by this system control processing block 19.

As for reproduction control, watermark information output from the watermark detection processing block 17 is referred to, and the output of the output processing block 15 is allowed to be output to the outside of the apparatus through the signal output terminal 18 if there is no problem with reproduction control and not allowed to be output to the outside of the apparatus through the signal output terminal 18 if there is a problem with reproduction control. When this judgment is to be made, the result of judgment on the type of the information recording medium may be referred to.

The watermark detection processing block 17 processes the recognition of the existence of watermarks from the output data of the data buffer control block 16 and the restoration of data embedded in watermarks when the watermarks are embedded. The operation of the watermark detection processing block 17 changes according to a format when each watermark is embedded. Since this watermark embedding format is hidden and not directly related to the present invention, its description is omitted.

The recognition result of the existence of watermarks obtained by the watermark detection processing block 17 and the data restored from the embedded watermarks are given to the system control processing block 19.

The system control processing block 19 receives information on the existence of watermarks and the data restored from the watermarks when the watermarks are existent and controls the optical disk reproduction system using these. The system control processing block may judge whether the first data is allowed to be output from the signal output terminal having a specific format on the basis of both of data informed from the detection means and data on the type of the information recording medium which records the first data and controls such that the first data is output from the specific signal output terminal when the first data is allowed.

The watermark detection processing block 17 recognizes the existence of watermarks and restores the data of the embedded watermarks. In the processing of detecting the watermarks, the watermarks may not be detected due to the insufficient embedding strength of the watermarks, the deterioration of a recording medium or the deterioration of watermark signals by image processing or reproduction processing such as the enlargement or reduction of image data embedded with the watermarks though the watermarks are embedded.

On the contrary, there may occur a case where the existence of watermarks is erroneously detected even when the watermarks are not embedded. Since it is likely that an erroneous result may be obtained if the result of one time of detection is directly used for reproduction control, when the same detection result is obtained a first predetermined number of times continuously, the result is judged as effective and transmitted to the system control processing block 19 and used for reproduction control.

Even when watermark detection and judgment are carried out by the above method, the possibility of erroneous judgment cannot be completely eliminated. Then, means of correcting erroneous judgment even when it is made is necessary. Then, after a watermark is detected the first predetermined number of times continuously and this result is judged as true and transmitted to the system control processing block 19 as described above, only when a detection result different from the first detection result is obtained a second predetermined number of times continuously, the judgment result is updated. The second predetermined number of times may be equal to or larger than the first predetermined number of times.

For instance, when a digital signal output terminal is provided as the signal output terminal 18 and a control code indicative of the prohibition of reproduction is detected from a watermark, the output of the output processing block 15 is not allowed to be output to the outside of the apparatus through the signal output terminal 18 because there is a problem with reproduction control. However, when a control code indicative of the permission of reproduction is detected from a watermark, the output of the output processing block 15 is allowed to be output to the outside of the apparatus through the signal output terminal 18.

When the digital signal output terminal is not provided as the signal output terminal 18, there is only an analog signal output, and it is confirmed that an optical disk is normally produced, the output of the output processing block 15 is allowed to be output to the outside of the apparatus through the signal output terminal 18.

The watermark detection processing block 17 does not need to detect watermarks directly from data 24 having a high data transfer rate by carrying out watermark detection processing on data stored in the buffer memory and may detect watermarks from the data stored in the buffer memory 23, thereby eliminating a restriction on detection speed. Thereby, processing speed which enables practical watermark detection is ensured while costs required for the addition of a watermark detection function are reduced, which has been difficult to be solved in the prior art.

Generally speaking, the reproduction signal processing block 14 and the reproduction signal output processing block 15 are constructed in the same device such as an LSI in an actual apparatus because data to be processed by these blocks have close relationship with each other and both blocks need a data buffer memory for temporarily storing the processed data. The data buffer memories for temporary storing these data (not shown) share a single memory block frequently. For the same reason as above, the incorporation of the data buffer control block 16 of the present invention in the above LSI and the use of the buffer memory 17 as the above buffer memories may be included in an embodiment of the present invention. Therefore, the block constitution shown in FIG. 1 is illustrated according to each functional block for the convenience of explanation, and the embodiment of the present invention and the actual LSI constitution are not limited to this.

The reason that the exclusive data bus 25 is used for the communication of the above reproduction control data between the watermark detection processing block 17 and the system control processing block 19 is given below. The reason for the use of the exclusive data bus is that data transferred over the data bus is information essential to reproduction control and technical means which will be described hereinafter is made easy-to-use in order to prevent the invalidation of reproduction control when the data is stopped or modified illegally.

A specific means of coping with stoppage is to confirm the connection of a right party by exchange authentication data to authenticate that the party has a fair right. A specific means of coping with modification is to use keys to encode data and transfer them over the bus so that the data are prevented from being decoded and modified. The above technical means for preventing illegal act on reproduction control information may use a method similar to a technique called "authentication" or "key exchange" which has been carried out between a DVD-ROM drive and a DVD decoder. The data is encoded using the authentication data and subsequently decoded using the same authentication data.

Data processing for watermark detection in the present invention will be outlined hereinafter. An aspect of the invention is that the data buffer control block 16 can provide sufficient buffering and buffer control so that the data delivered to output control processor 15 occurs at a data rate that is different from the data being delivered the detection processing block 17. In an embodiment of the invention, the detection processing block issues a signal indicating the data rate at which the data buffer control block is to deliver the data. A further aspect of the invention is that the detection processing block 17 can output data at a rate different from the data rate at which it receives data.

A description is subsequently given of the method of controlling the buffer memory 23 by means of the data buffer control block 16.

Figure 2:
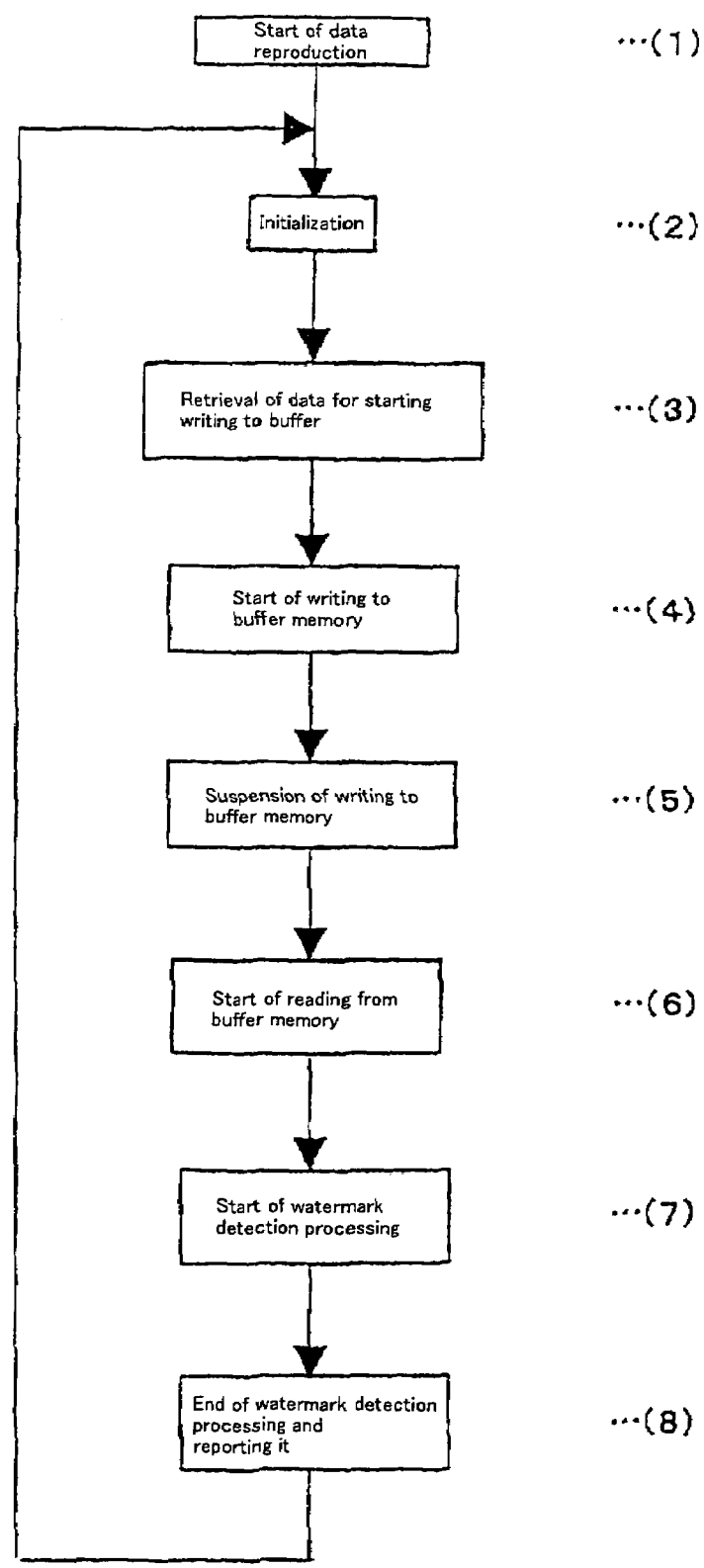
FIG. 2 is a flowchart showing an example of a buffer memory control method for watermark detection according to the present invention.

FIG. 2 is a flowchart of an example of the method of controlling the buffer memory for watermark detection in the present invention.

After the system control processing block 19 starts the reproduction of data (step 1), initialization is first carried out (step 2) and then data for starting writing to the buffer memory 243 is retrieved (step 3). When the data of interest is found, writing to the buffer memory is started (step 4). When a predetermined amount of data required for watermark detection is written to the buffer memory, writing to the buffer memory is suspended (step 5). Thereafter, reading data for carrying out watermark detection from the buffer memory is started (step 6) and input into the watermark detection processing block 17 to start the processing of watermark detection (step 7). When the processing of watermark detection by the watermark detection processing block ends (step 8), the data buffer control processing block 10 is informed of the end of detection processing. Since data stored in the buffer memory 23 is not necessary until then, the buffer memory is initialized again (step 1). Afterward, the above operation is carried out during the reproduction of data as required.

Figure 3:
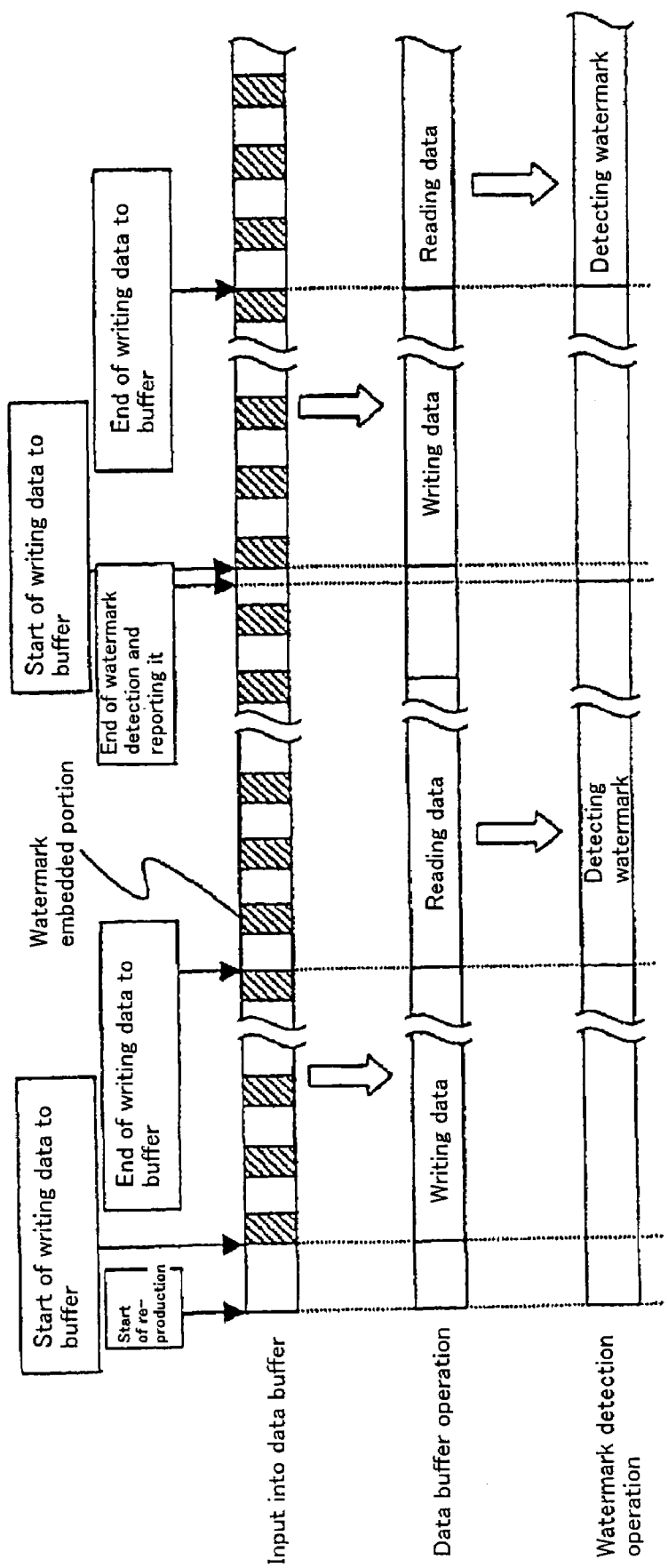
FIG. 3 is a diagram showing an example of data flow related to the watermark detection operation of a data reproduction apparatus having a watermark detection function according to the present invention.

FIG. 3 shows an example of data flow related to the watermark detection operation of a data reproduction apparatus having a watermark detection function according to the present invention.

When the reproduction of data from an optical disk is started, data 24 reproduced by the reproduction signal processing block 14 is input into the data buffer control block 16. This data 24 is retrieved to find whether the data includes data which needs watermark detection. When the data includes data which needs watermark detection, the data buffer control block 16 stores a part which may include a watermark of the input data in the buffer memory 23. At this point, the start position and amount of the data to be stored should be specified by the format used when watermarks are embedded. This watermark embedding format is generally hidden and the details of this format are not necessary in the present invention. Therefore, its description is omitted but the data buffer control block 16 operates to temporarily store data whose amount is larger than the minimum unit of data required for watermark detection in the buffer memory 23.

When writing data ends, reading data is started and the read data is input into the watermark detection processing block 17 to carry out the processing of watermark detection.

When a signal indicative of the end of the processing of watermark detection is transmitted from the watermark detection processing block 17 to the data buffer control block 16, the data buffer control block 16 starts the retrieval of the data 24 again to store data which may include a watermark in the buffer memory 23.

Figure 5:
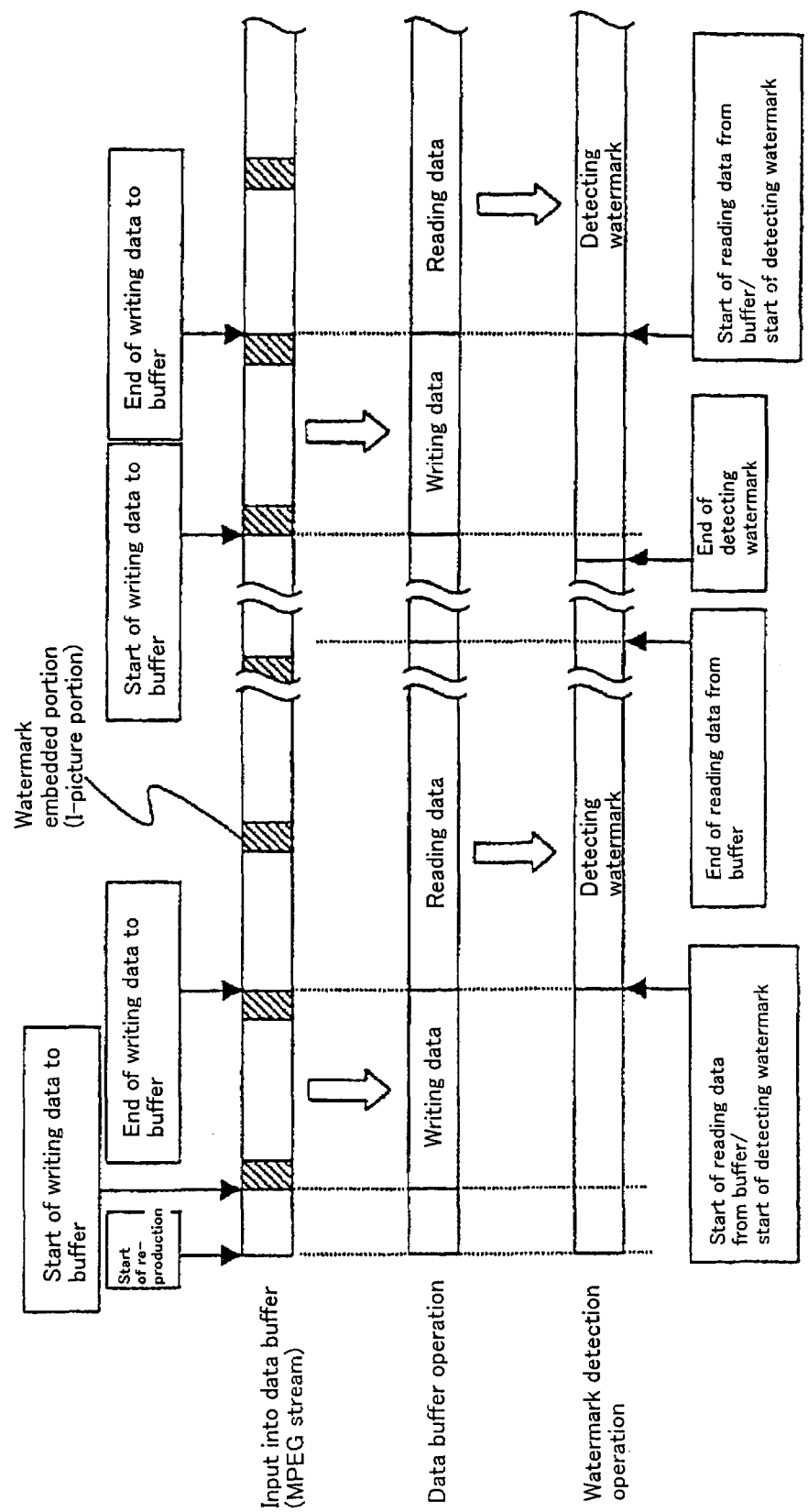
FIG. 5 is a diagram showing an example of data flow related to the watermark detection operation of a data reproduction apparatus having a watermark detection function according to the present invention.

The above embodiment will be described in more detail. FIG. 5 shows an example of data flow related to the watermark detection operation of a data reproduction apparatus having a watermark detection function according to the present invention of FIG. 3. The apparatus is based on the assumption that signals input into the data buffer are a stream of MPEG2 signals and a watermark is embedded in an I picture portion. It is assumed that the amount of data stored in the buffer memory 23 at one time as the minimum unit for watermark detection is the amount of data of two continuous I pictures.

In the above case, the data buffer control block 16 detects the head of the I picture and starts writing data to the buffer memory 23 from there. When the data of the two continuous I pictures are stored in the buffer memory 23, writing data to the buffer memory 23 ends and then the watermark detection processing block 17 starts reading data from the buffer memory 23. The processing of watermark detection is started from the read data and when the processing of watermark detection ends, the detection result is transferred to the system control processing block 19 (not shown). Meanwhile, the data stored in the buffer memory 23 becomes unnecessary after the end of watermark detection processing, the data buffer control block 16 detects the head of the I picture again and starts writing data to the buffer memory 23 from there.

The above processing is carried out repeatedly as required to carry out watermark detection.

Figure 4:
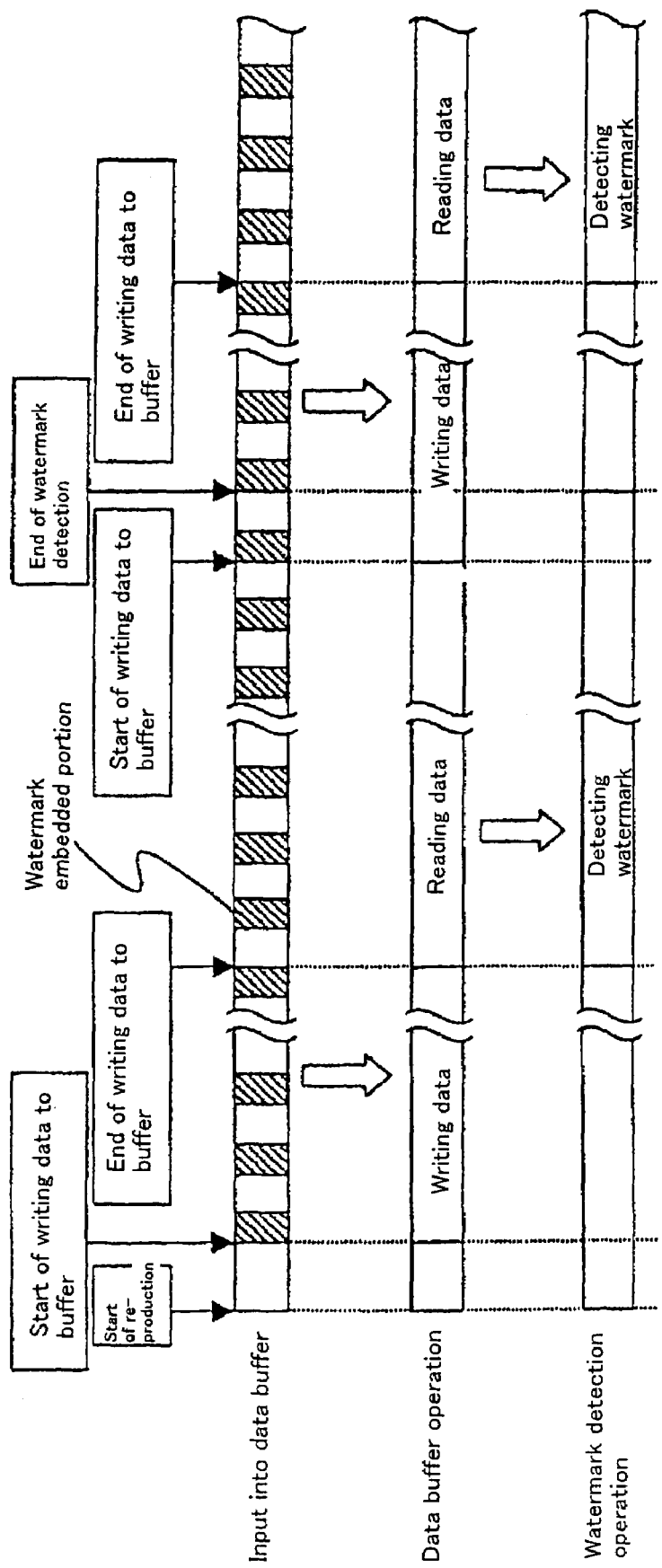
FIG. 4 is a diagram showing an example of data flow related to the watermark detection operation of a data reproduction apparatus having a watermark detection function according to the present invention.

FIG. 4 shows another example of data flow related to the watermark detection operation of a data reproduction apparatus having a watermark detection function according to the present invention like FIG. 3.

Descriptions of the same portions as in FIG. 3 are omitted and different portions will be described hereinafter.

The difference between the data flow of FIG. 3 and the data flow of FIG. 4 is that the timing of starting writing data to the buffer memory 23 is after the end of watermark detection in FIG. 3 whereas it is after the end of watermark detection in FIG. 4. Thereby, the timing of writing data is relatively advanced and the timing of ending writing data is accordingly advanced, whereby the cycle from the start of writing data to the start of writing next data is shortened.

That is, in the case of FIG. 3, T=data write time+ watermark detection time.

On the other hand, in the case of FIG. 4,

T=data write time+data read detection time.

When watermark detection time>data read detection time, T can be shortened and the throughput of watermark detection can be improved.

Figure 6:
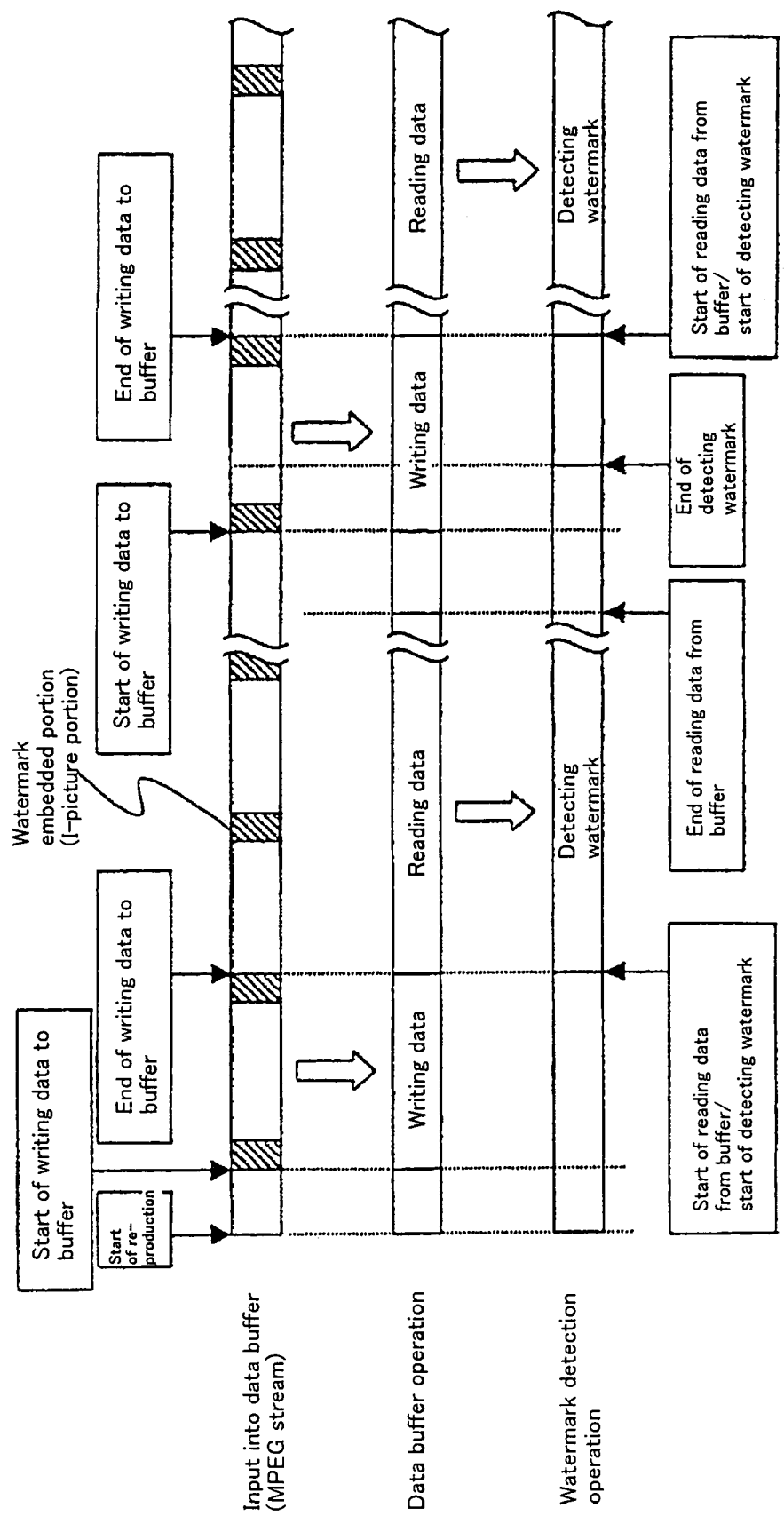
FIG. 6 is a diagram showing an example of data flow related to the watermark detection operation of a data reproduction apparatus having a watermark detection function according to the present invention.

As in FIG. 5, an example of the above embodiment will be described in more detail hereinafter. FIG. 6 shows an example of data flow related to the watermark detection operation of a data reproduction apparatus having a watermark detection function according to the present invention of FIG. 4. This apparatus is based on the assumption that signals input into the data buffer are a stream of MPEG2 signals and a watermark is embedded in an I picture portion. It is assumed that the amount of data stored in the buffer memory 23 at one time as the minimum unit for watermark detection is the amount of data of two continuous I pictures.

In the above case, the data buffer control block 16 detects the head of the I picture and starts writing data to the buffer memory 23 from there. When the data of the two continuous I pictures are stored in the buffer memory 23, the writing of data to the buffer memory 23 ends, and the watermark detection processing block 17 starts reading data from the buffer memory 23. The processing of watermark detection is started from the read data and when the processing of watermark detection ends, the detection result is transferred to the system control processing block 19 (not shown). Meanwhile, the data stored in the buffer memory 23 becomes unnecessary after the data is read the data buffer control block 16 detects the head of the I picture again and starts writing data to the buffer memory 23 from there. The above processing is carried out repeatedly as required to detect watermarks.

A useful function added to the data buffer control processing block 16 will be described hereinafter. Generally speaking, an optical disk drive is generally used for various types of media so that different types of formatted data are transmitted to a reproduction data bus in the drive according to optical disk media to be reproduced. Therefore, a data format conversion function is provided to the data buffer control block 16. Thereby, the watermark detection processing block 17 may handle a specified data format. As a matter of course, a circuit block having a data format conversion function is not limited to the data buffer control block 16 and may be the watermark detection processing block 17. The same data sequence is not written to the buffer memory or read from the buffer memory but only a required data portion is rearranged based on a predetermined format and read so that data to be written to the buffer memory and data to be read from the buffer memory are rearranged to convert the format of the data.

Consequently, it is possible to provide the object of adjusting the data transfer rate to eliminate the difference between the high data transfer rate of the data 24 and the data transfer rate which enables the processing of the watermark detection processing block 17 and the object of converting the data format of the data 24 into a data format which can be accepted by the watermark detection processing circuit block 17 to the data buffer control block 16 and the buffer memory 23.

In the description of the above embodiment, data to be stored in the buffer memory 23 out of the data 24 is continuous data starting from a specific portion which may include a watermark. The present invention is not limited to this and the data may be a specific extract which may include a watermark. Thereby, the capacity of the buffer memory can be reduced.

A required portion of data for watermark detection may be retrieved and used when data which starts from an arbitrary position is stored and read. Thereby, data buffer control can be simplified.

In the explanation of the above embodiment, there has been described a memory control method in which the data buffer control block 16 does not read data from the buffer memory 23 while it writes data to the buffer memory 23 and starts reading data after the end of writing. The present invention is not limited to this and a memory control method in which writing and reading are carried out alternately on a time-division basis may be employed. Since data reading and watermark detection processing can be thereby started almost at the same time, the throughput of watermark detection can be improved. The throughput can be also improved by using a memory having a plurality of data ports as the buffer memory 23 to write and read at the same time.

According to the present invention, since the first data on which watermark detection is made is stored in the data storage means having a buffer memory function and watermark detection can be made on the data stored in the data storage means, watermark detection does not need to be made from the first data having a high data transfer rate directly, thereby eliminating a restriction on detection speed. Since data stored in the data storage means is updated again after one time of watermark detection ends and watermark detection is made on the updated first data, embedded watermarks can be detected intermittently. Therefore, even when a watermark cannot be detected correctly at the time of one time of detection due to signal deterioration or the like, the subsequent detection result is used to carry out the processing of reproduction control. Therefore, the problem of costs required for the addition of a watermark detection function and the problem of processing speed which enables watermark detection can be solved at the same time.

What is claimed is:

1. An apparatus for playing back data stored on an information recording medium, the data having audio information, visual information, or audio-visual information, the data containing a watermark, the apparatus comprising:
   a reproduction processing circuit configured to receive the information that is stored on the information recording medium to produce the data; and
   playback circuitry comprising:
      a data store;
      a data selection circuit configured to select a subset of the data which is necessary for the detection of the watermark and to store the subset of the data into the data store;
      a detecting circuit coupled to the data store and configured to process data contained therein to produce a detection result, the detection result being based on the watermark; and
      a control circuit configured to selectively output the data based on the detection result,
   wherein the data selection circuit and the detecting circuit operate in alternating fashion to alternate between storing a subset of the data to the data store and reading out the subset of the data for watermark detection.

2. The apparatus of claim 1 further comprising a data selection circuit configured to select a first subset of the data, the data selection circuit coupled to deliver the first subset to the data store, wherein the detecting circuit processes the first subset.

3. The apparatus of claim 2 wherein the capacity of the data store is equal to or greater than the minimum size of the first subset.

4. The apparatus of claim 2 wherein the detecting circuit is further configured to produce a signal indicating the completion of processing of the first subset, wherein the selection circuit selects, in response to the signal, a second subset of the data, and wherein the second subset replaces the first subset.

5. The apparatus of claim 2 wherein the detecting circuit is further configured to indicate that the first subset has been delivered to the data store, and wherein the selection circuit selects, in response thereto, a second subset from the data for delivery to the data store.

6. The apparatus of claim 2 wherein the data is an ISO-MPEG 2 formatted data stream, and wherein the first subset is an I-picture.

7. The apparatus of claim 1 further including a data bus coupled only between the detection circuit and the control circuit, wherein the detection circuit produces a signal representative of the detection result, the signal being sent to the control circuit via the data bus.

8. The apparatus of claim 1 wherein the detection circuit produces a signal representative of the detection result, the detection circuit further configured to encode the signal using a decryption key, the control circuit further configured to receive the encoded signal and to decode the signal using the decryption key.

9. The apparatus of claim 1 wherein the detection circuit produces a signal representative of the detection result, wherein the detection circuit and the control circuit are further configured to exchange authentication data with each other, and wherein the detection circuit is further configured to deliver the signal to the control circuit when the detection circuit makes a positive determination that the control circuit is permitted to receive the signal.

10. The apparatus of claim 9 wherein the detection circuit is further configured to encode the signal using the authentication data, and the control circuit is further configured to receive the encoded signal and to decode the signal using the authentication data.

11. The apparatus of claim 1 wherein the detection circuit produces a first signal when processing of data in the data store produces the detection result a first predetermined number of times in succession, the control circuit selectively outputting the first data in response to the signal.

12. The apparatus of claim 11 wherein the detection circuit, subsequent to producing the first signal, produces a second signal when processing of data in the data store produces a second detection result a second predetermined number of times in succession, the control circuit selectively outputting the first data in response to the first and second signals.

13. The apparatus of claim 1 wherein the first data is ISO-MPEG 2 formatted.

14. The apparatus of claim 1 wherein the data store receives at least some of the data at a data rate equal to a data rate at which the reproduction processing circuit produces the data.

15. The apparatus of claim 1 wherein the data store receives a subset of the data at a first data rate equal to a data rate at which the reproduction processing circuit produces the data,
wherein the detecting circuit is further configured to indicate a second data rate and the data store is further configured to output the data contained therein at the second data rate in response thereto.

16. The apparatus of claim 1 wherein the detecting circuit is further configured to receive data contained in the data store at a third data rate and process the data to produce a detection result at a fourth data rate, wherein the fourth data rate is equal to or greater than the third data rate.

17. An apparatus for playing back data stored on an information recording medium, the data containing a watermark, the apparatus comprising:
a reproduction processing circuit configured to receive the information that is stored on the information recording medium to produce the data; and
playback circuitry comprising:
a data store;
a data selection circuit configured to select a subset of the data which is necessary for the detection of the watermark and to store the subset of the data into the data store;
a detecting circuit coupled to the data store and configured to process data contained therein to produce a detection result, the detection result being based on the watermark; and
a control circuit configured to selectively output the first data based on the detection result and the type of the information recording medium,
wherein the data selection circuit and the detecting circuit operate in alternating fashion to alternate between storing a subset of the data to the data store and reading out the subset of the data for watermark detection.

18. A method in a playback device for playing back data, the data having audio information, visual information, or audio-visual information, the data containing a watermark, the method comprising:
receiving the data from the information recording medium;
selecting a subset of the data which is necessary for the detection of the watermark;
storing the subset of the data in a data store;
the playback component producing a detection result by processing data in the data store, the detection result based on the watermark;
the playback component selectively outputting the data based on the detection result; and
reading out the subset of the data,
wherein the storing the subset of the data and the reading out the subset of the data operates in alternating fashion for watermark detection.

19. The method of claim 18 wherein selectively outputting is further based on the type of the data source.

20. An apparatus for playing back data having audio information, visual information, or audio-visual information, the data containing a watermark, the apparatus comprising:
first means for providing the data from an information recording medium; and
a playback component comprising:
second means, coupled to the first means, for storing a subset of the first data which is necessary for the detection of the watermark into a data store;
third means for producing a detection result, including means for processing data stored in the second means, the detection result being based on the watermark; and
fourth means, operatively coupled to the third means, for selectively outputting the data based on the detection result,
wherein the second means and the third means operate in alternating fashion to alternate between storing a subset of the data to the data store and reading out the subset of the data for watermark detection.

21. An apparatus for playing back data having audio information, visual information, or audio-visual information, the data containing a watermark and stored in an information storage medium, the apparatus comprising:
a reproduction processing circuit configured to receive information stored on the information recording medium; and
playback circuitry to reproduce the data containing the watermark, the playback circuitry comprising:
a detecting circuit configured to detect the watermark;

a data selection circuit configured to select a subset of the data which is necessary for the detection of the watermark;

a data store configured to store the subset; and a reproduction control circuit configured to control the reproduction of the data depending upon a result of the detection of the watermark by the detecting circuit, wherein the data store is shared by the reproduction processing circuit and the detecting circuit, wherein the data selection circuit and the detecting circuit operate in alternating fashion to alternate between storing a subset of the data to the data store and reading out the subset of the data for watermark detection.

22. The apparatus of claim 1, wherein the watermark represents copyright protection information on the data.

23. The apparatus of claim 17, wherein the watermark represents copyright protection information on the data.

24. The apparatus of claim 20, wherein the watermark represents copyright protection information on the data.

* * * * *